Patented May 30, 1944

2,349,814

UNITED STATES PATENT OFFICE 2,349,814

INSECTICIDE

Christian C. Deonier and Howard A. Jones, Orlando, Fla., dedicated to the free use of the People in the territory of the United States No Drawing. Application January 15, 1944, Serial No. 518,392

10 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to an insecticide comprising a solid solution of 2,2-bis-(p-chlorophenyl)-1,1,1-trichloroethane, hereinafter referred to as dichlorodiphenyltrichloroethane, in a waxy solid.

The principal object of this invention is to provide a long-lasting solid insecticide that is not subject to the deleterious effects of water and one in which, at the same time, the effectiveness of the active ingredient is not adversely influenced.

A further object of this invention is to provide a solid insecticidal material in which the active ingredient is in solution, and therefore homogeneously dispersed, in the solid carrier.

We have found that when dichlorodiphenyltrichloroethane is mixed with a waxy solid in certain proportions and under suitable conditions, a homogeneous solid solution results. No crystals of dichlorodiphenyltrichloroethane are visible under the microscope. Because of the homogeneous distribution of the active insecticidal agent throughout the solid solution, this product is superior in efficacy to compositions made by ordinary coating of the active agent. This solid solution may be used as a novel insecticide in a number of ways. We have found that such a solid solution may be ground to a fine state of subdivision and applied as a dust for killing mosquito larvae. When used in this manner the solid solution of dichlorodiphenyltrichloroethane is no less toxic initially than the equivalent amount of untreated dichlorodiphenyltrichloroethane, and at the same time it exhibits much better lasting qualities and withstands a far greater amount of rainfall than does the untreated dichlorodiphenyltrichloroethane.

The dichlorodiphenyltrichloroethane herein referred to is the product obtained on condensation of chloral or chloral hydrate with chlorobenzene by use of a condensing agent. This product is known as 2,2-bis-(p-chlorophenyl)-1,1,1-trichloroethane. It is quite clear that if this compound may be used in the manner described, products derived from chloral and other substituted benzenes may also be used in the same way.

The waxy solids used to prepare the product of this invention belong to such groups as solid organic acids, alcohols, esters, and combinations of these. We have used such materials as stearic acid, palmitic acid, stearyl alcohol, cetyl alcohol, glyceryl monostearate, and hydrogenated cottonseed oil for this purpose.

The solid solution of dichlorodiphenyltrichloroethane and waxy solid may be prepared in several ways. The two simplest methods of preparation involve (1) melting the dichlorodiphenyltrichloroethane and waxy solid together in the proper proportions and allowing the melt to cool, or (2) dissolving the dichlorodiphenyltrichloroethane and waxy solid in the proper proportions in a mutual volatile solvent and removing said solvent by evaporation. In either case the resulting solid solution may be ground to the desired fineness for application in any way in which solid insecticides are used.

The following examples will serve to illustrate the method of preparing the insecticidal solid solutions covered by this invention:

Example I 100 g. of dichlorodiphenyltrichloroethane is mixed with 900 g. of stearic acid and the whole dissolved in 5 liters of benzene. The benzene is removed by evaporation. The resulting solid solution is ground in a hammer mill.

Example II 200 g. of dichlorodiphenyltrichloroethane is mixed with 800 g. of glyceryl monostearate and the mixture held above the melting point of the glyceryl monostearate until mutual solution has occurred. The melt is allowed to cool to room temperature and ground to suitable fineness for use.

Example III 20 g. of dichlorodiphenyltrichloroethane and 80 g. of stearic acid are dissolved in 200 ml. of chloroform. The solution is sprayed from a suitable sprayer into a closed space about 6 ft. by 6 ft. by 20 ft. long. The chloroform evaporates and the solid solution deposits as a coarse powder on the floor of the "spray tunnel".

We have found that the powdered solid solution prepared by any of the methods described above to be of particular value as an insecticidal dust against *Anopheles quadrimaculatus* larvae. The data given below will serve to illustrate the insecticidal efficacy and improved lasting qualities of the product of this invention.

In laboratory tests a dust of the solid solution of 1 part by weight of dichlorodiphenyltrichloroethane and 4 parts by weight of stearic acid, and another dust of dichlorodiphenyltrichloroethane mixed mechanically with talc were applied at the rate of ½ pound of active ingredient per acre. These dusts were subjected to a 6-inch artificial rain every 2 days. *A. quadrimaculatus* larvae were introduced after each rain. The solid solution of our invention withstood 20 to 23 rains and was effective in killing larvae for 41 to 44 days. The dichlorodiphenyltrichloroethane mixed with talc withstood only 14 to 16 rains and killed larvae for only 26 to 30 days.

In tests made in a natural anopheline breeding place, the water within floating cylinders was treated with dust at the rate of one pound of active ingredient per acre. *A. quadrimaculatus* larvae were introduced into the cylinders every two days. Results were even more striking than in the laboratory. Treatments in the cylinders dusted with the solid solution of 1 part by weight of dichlorodiphenyltrichloroethane with 4 parts by weight of stearic acid were effective in killing larvae for 35 to 44 days, being subjected to natural precipitation of 8.63 inches during that time. In cylinders dusted with dichlorodiphenyltrichloroethane alone, the treatment lasted only 7 to 35 days under an average of only 4.33 inches precipitation.

In the same natural breeding environment, cylinders were set in the sandy bottom. These were dusted at the rate of one pound of active ingredient per acre, subjected to an artificial rain of 2 inches in 2 minutes and the cylinders covered thereafter. *A. quadrimaculatus* larvae were introduced every two days. The solid solution of 1 part by weight of dichlorodiphenyltrichloroethane and 4 parts by weight of stearic acid continued to kill larvae for 43 days, while the dichlorodiphenyltrichloroethane alone killed larvae for only 18 days.

The above examples are not to be construed as limiting either the method of application of this novel insecticide or the kinds of insects to which it may be applied.

We do not limit ourselves to the proportions of dichlorodiphenyltrichloroethane to waxy solid given in the foregoing examples. The proportions may be varied over a wide range. It is further understood that the above-mentioned compounds are used merely as examples and that this invention is not restricted by such use. We have prepared other organic insecticides such as 2,4-dinitro-6-cyclohexylphenol and phenothiazine in solid solutions in stearic acid for use as larvicidal dusts. It should also be clear that waxy solids other than those mentioned will be found equally suitable for preparing these solid solutions.

Having thus described our invention, we claim:

1. An insecticidal composition comprising a solid solution of 2,2-bis-(p-chlorophenyl)-1,1,1-trichloroethane in a waxy solid.

2. An insecticidal composition comprising a solid solution of 2,2-bis-(p-chlorophenyl)-1,1,1-trichloroethane in a waxy solid organic acid.

3. An insecticidal composition comprising a solid solution of 2,2-bis-(p-chlorophenyl)-1,1,1-trichloroethane in a waxy solid organic alcohol.

4. An insecticidal composition comprising a solid solution of 2,2-bis-(p-chlorophenyl)-1,1,1-trichloroethane in a waxy solid organic ester.

5. An insecticidal composition comprising a solid solution of 2,2-bis-(p-chlorophenyl)-1,1,1-trichloroethane in a waxy solid mixture of organic acids, alcohols and esters.

6. An insecticidal composition comprising a solid solution of 2,2-bis-(p-chlorophenyl)-1,1,1-trichloroethane in stearic acid.

7. An insecticidal composition comprising a solid solution of 2,2-bis-(p-chlorophenyl)-1,1,1-trichloroethane in cetyl alcohol.

8. An insecticidal composition comprising a solid solution of 2,2-bis-(p-chlorophenyl)-1,1,1-trichloroethane in solid hydrogenated cottonseed oil.

9. An insecticidal composition comprising a solid solution consisting of one part by weight of 2,2-bis-(p-chlorophenyl)-1,1,1-trichloroethane in four parts by weight of stearic acid.

10. An insecticidal composition comprising a solid solution consisting of one part by weight of 2,2-bis-(p-chlorophenyl)-1,1,1-trichloroethane in nine parts by weight of stearic acid.

CHRISTIAN C. DEONIER.
HOWARD A. JONES.